(No Model.)
C. H. McBRIDE.
WHIFFLETREE.
No. 475,699.
Patented May 24, 1892.
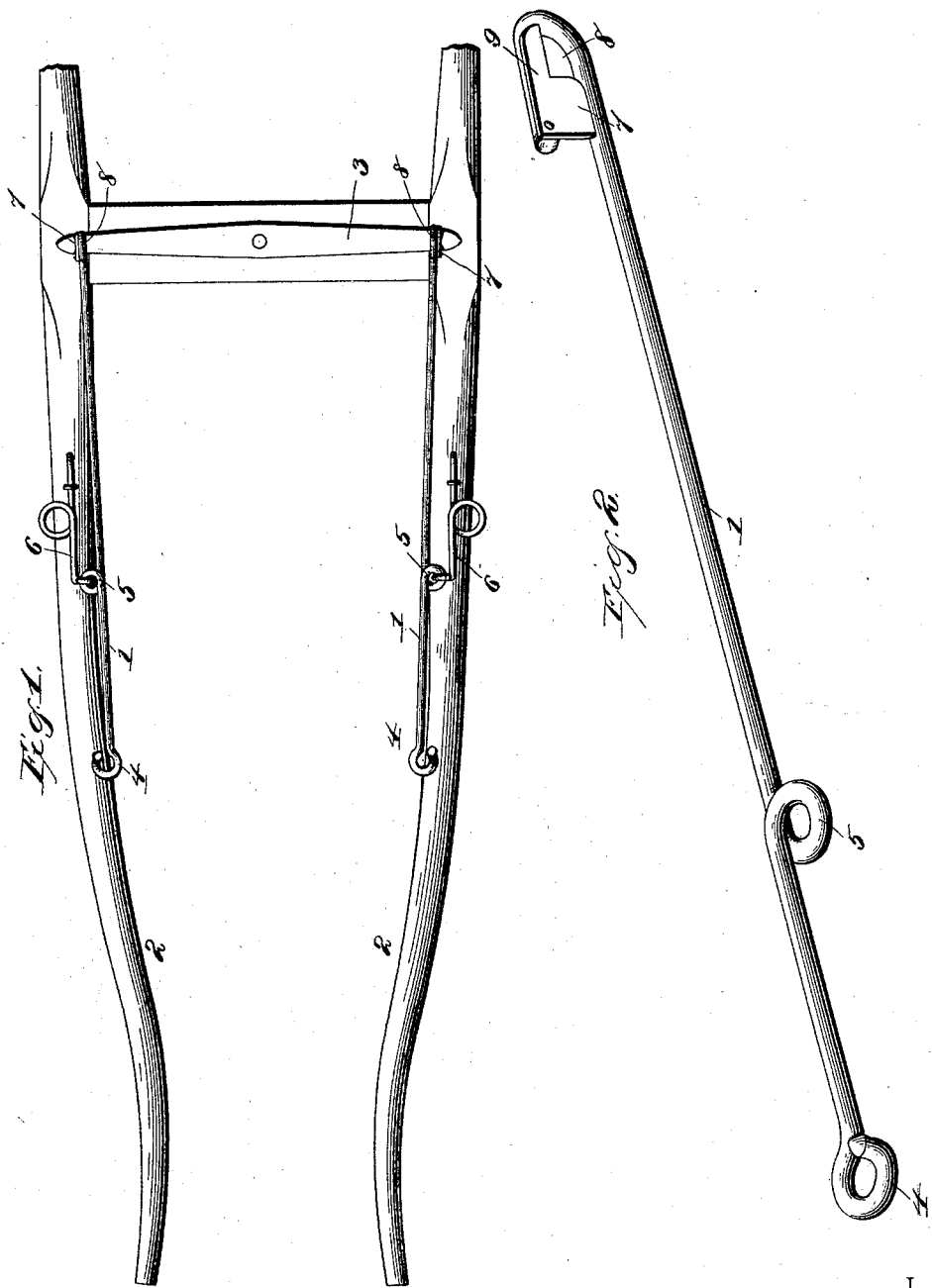
Witnesses
E. C. Hindeman
H. J. Riley
Inventor
Chas. H. McBride
By his Attorneys,
C. A. Snow & Co.

UNITED STATES PATENT OFFICE.

CHARLES HOWLAND McBRIDE, OF CHAMPLAIN, ASSIGNOR OF ONE-HALF TO MILLARD FILLMORE STOWE, OF MOOERS, NEW YORK.

WHIFFLETREE.

SPECIFICATION forming part of Letters Patent No. 475,699, dated May 24, 1892.

Application filed November 21, 1891. Serial No. 412,599. (No model.)

*To all whom it may concern:*

Be it known that I, CHARLES HOWLAND MCBRIDE, a citizen of the United States, residing at Champlain, in the county of Clinton and State of New York, have invented a new and useful Whiffletree Attachment, of which the following is a specification.

The invention relates to improvements in attachments for whiffletrees.

The object of the present invention is to provide a device designed to be attached to a whiffletree and to be mounted on the shaft to form a permanent part of the latter to enable short traces to be employed, whereby the latter are prevented dragging on the ground and becoming soiled in bad weather and the necessity of tying them up is obviated and a horse may be hitched to a vehicle while a person is holding the head of the animal.

The invention consists in the construction and novel combination and arrangement of parts hereinafter fully described, illustrated in the accompanying drawings, and pointed out in the claims hereto appended.

In the drawings, Figure 1 is a plan view of a pair of shafts provided with an attachment constructed in accordance with this invention. Fig. 2 is a detail perspective view of one of the bars.

Referring to the accompanying drawings, 1 designates a pair of bars, which are arranged on a pair of shafts 2 and form a permanent part thereof and have their rear ends connected to a whiffletree 3 and provided at their front ends with draft-hooks 4, whereby the point of attachment of a horse to a vehicle is at its side instead of behind it, thereby enabling short traces to be employed, which will not drag on the ground and which may be connected to the draft-hooks 4 without necessitating a person leaving the head of the animal. The bars may be round, flat, square, or segmental in cross-section, as desired, and they are provided intermediate their ends with eyes 5, which are engaged by springs 6, secured to the shafts and holding the bars on the shafts and maintaining the whiffletree in proper position, and at the same time the springs allow the bars to move freely to conform to the motion of an animal. The bars may be arranged in suitable guides, and anti-friction rollers may be employed, if found necessary or desirable. The rear end of the bar 1 is bent upon itself to form a hook to engage the end of a whiffletree, and the whiffletree is secured in the hook by a pivoted plate 7, which closes the mouth of the hook 8. The plate 7 is constructed of sheet metal and is pivoted to the ends of the hook and is provided with a recess, which is formed by a projection 9, and the sides of the recess engage the whiffletree and prevent the plate being accidentally swung aside. The spring 6 has one end secured to the shaft and is provided intermediate its ends with a coil and has its other end engaging the eye of the adjacent bar.

It will be seen that the device is simple and inexpensive in construction and adapted to be readily applied to the shafts of a vehicle and is capable of enabling short traces to be employed, which will not drag on the ground and which will not have to be tied up and which may be readily connected with the whiffletrees without removing the hand from the bridle or leaving the head of an animal.

What I claim is—

1. The combination, with the shafts and the whiffletree, of the bars arranged on the shafts and extending longitudinally thereof and having their rear ends connected to the whiffletree and their front ends provided with draft-hooks, and springs secured to the shafts and engaging the bars, substantially as described.

2. The combination, with a pair of shafts and a whiffletree, of bars arranged on the shafts and having their rear ends connected to the whiffletree and provided at their front ends with draft-hooks and having intermediate their ends eyes, and the springs provided at their ends with coils and each having one end secured to a shaft and its other end engaging an eye, substantially as described.

3. The combination of the shafts, the whiffletree, the bars arranged on the shafts and provided at their front ends with draft-hooks and having their rear ends bent upon themselves to form hooks, and the plates pivoted to the hooks and closing the mouths of the same and provided with recesses to receive and engage the whiffletree, substantially as described.

In testimony that I claim the foregoing as my own I have hereto affixed my signature in the presence of two witnesses.

CHARLES HOWLAND McBRIDE.

Witnesses:
GEORGE CONRAD KAUFMAN,
EZEKIEL BRISBAN SHUTE.